INVENTORS
KENNETH A. BROWNE
JOHN A. BURKE
BY GEORGE J. SENNHAUSER
Hudson, Boughton,
Williams, David & Hoffmann
ATTORNEYS Feb. 23, 1960  K. A. BROWNE ET AL  2,925,791
ROAD-RAIL VEHICLE COUPLING AND TRANSFER MECHANISM
Filed March 27, 1958  8 Sheets-Sheet 3

INVENTORS
KENNETH A. BROWNE
JOHN A. BURKE
BY GEORGE J. SENNHAUSER

ATTORNEYS

Feb. 23, 1960   K. A. BROWNE ET AL   2,925,791
ROAD-RAIL VEHICLE COUPLING AND TRANSFER MECHANISM
Filed March 27, 1958   8 Sheets-Sheet 6

INVENTORS
KENNETH A. BROWNE
JOHN A. BURKE
BY GEORGE J. SENNHAUSER
Hudson Boughton,
Williams, David & Hoffmann
ATTORNEYS

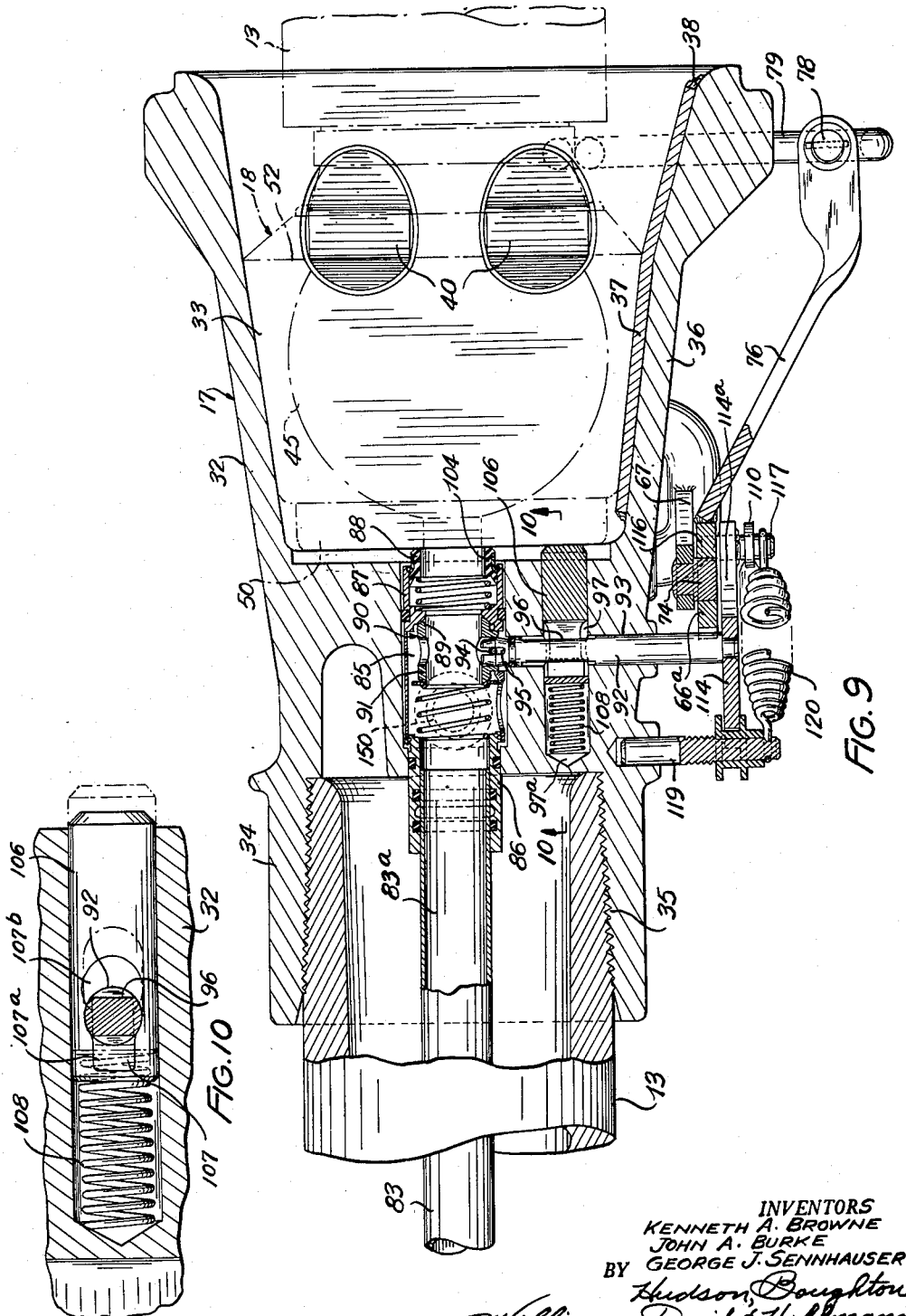

Feb. 23, 1960 K. A. BROWNE ET AL 2,925,791
ROAD-RAIL VEHICLE COUPLING AND TRANSFER MECHANISM
Filed March 27, 1958 8 Sheets-Sheet 8
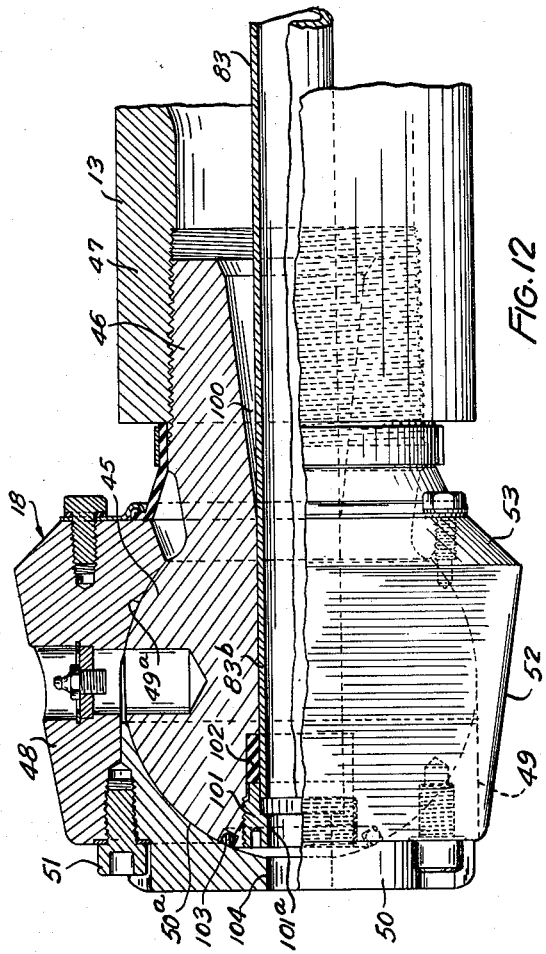
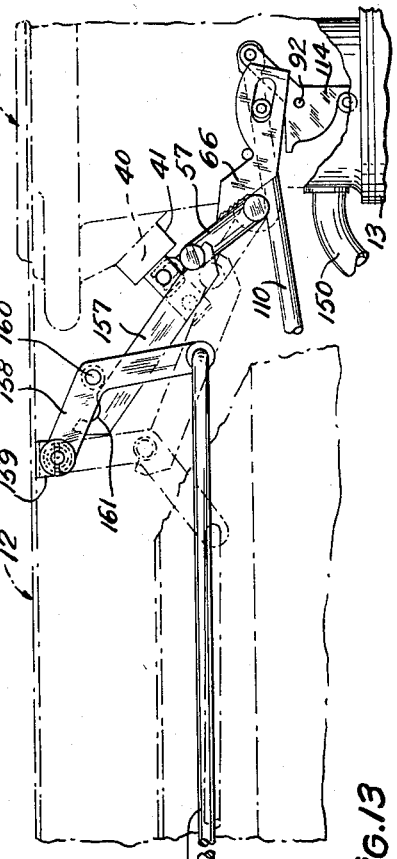
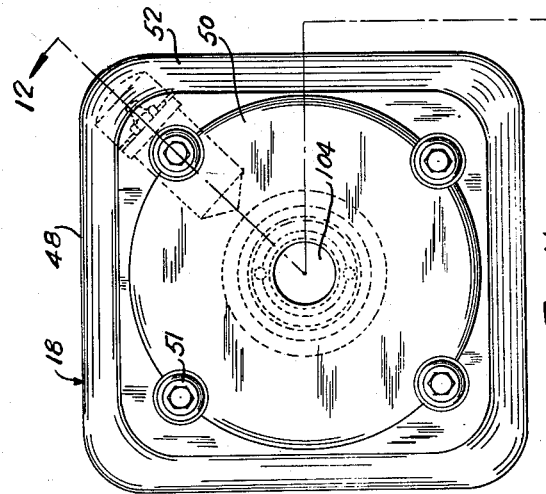
INVENTORS
KENNETH A. BROWNE
JOHN A. BURKE
BY GEORGE J. SENNHAUSER
Hudson, Boughton,
Williams, David & Hoffmann
ATTORNEYS

United States Patent Office 2,925,791
Patented Feb. 23, 1960

2,925,791
ROAD-RAIL VEHICLE COUPLING AND TRANSFER MECHANISM

Kenneth A. Browne, Lakewood, John A. Burke, Cleveland Heights, and George J. Sennhauser, Parma, Ohio, assignors to The Chesapeake and Ohio Railway Company, Cleveland, Ohio, a corporation of Virginia Application March 27, 1958, Serial No. 724,373

20 Claims. (Cl. 105—215)

This invention relates to road-rail vehicles and, more particularly, to the provision in such vehicles of novel coupling and transfer control mechanism to enable the vehicles to be used individually or in trains, and to expeditiously and safely control the transfer of the vehicle from road-wheel use to rail-wheel use, or vice versa.

Related copending application Serial No. 548,602, filed November 23, 1955, now Patent 2,889,785, issued June 9, 1959, discloses a road-rail vehicle having a wheel suspension comprised of road wheels and rail wheels connected with the vehicle frame structure by torsion spring means and selectively swingable to and from a load-carrying position by transfer mechanism which includes a reversible drive motor.

The present invention provides novel control means for the drive motor of the transfer mechanism of such a road-rail vehicle, and also provides novel coupling and coupling control means for connecting such road-rail vehicles into trains or disconnecting the same therefrom.

The invention further provides novel coupling control means and transfer control means which are interrelated so that the step of connecting the road-rail vehicles into trains or disconnecting the same therefrom, and the step of transferring from a road-wheel condition to a rail-wheel condition and vice versa, can be carried out in a safe and expeditious manner by the use of a minimum amount of control equipment disposed in a readily accessible location.

Other novel features and advantages of this invention will be apparent in the following detailed description and in the accompanying sheets of drawings forming a part of this specification and wherein:

Fig. 9 is a vertical longitudinal section taken through the female coupler on section line 9—9 of Fig. 8;

Fig. 10 is a fragmentary sectional view taken on section line 10—10 of Fig. 9;

Fig. 11 is an end elevation of the male coupler;

Fig. 12 is an elevation view of the male coupler showing the same partially in vertical longitudinal section, the view being taken as indicated by the section line 12—12 of Fig. 11; and Fig. 13 is a partial plan view corresponding with a portion of Fig. 4 and showing a different form of coupler releasing means.

Figures 1, 2:
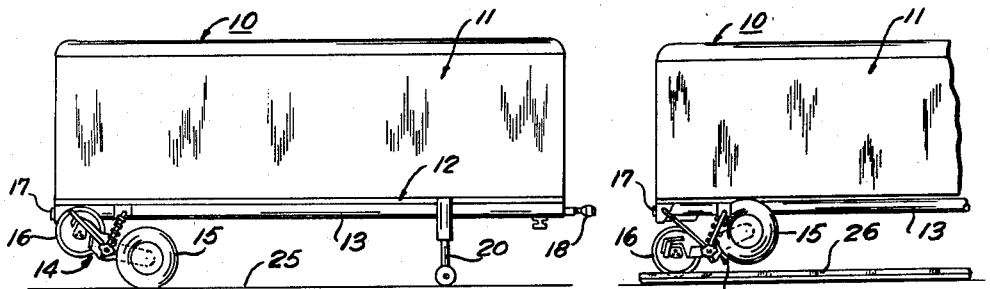
Fig. 1 is a side elevation of a road-rail vehicle embodying this invention and showing the vehicle with the road wheels thereof in the load-carrying position.
Fig. 2 is a partial side elevation similar to that of Fig. 1 but showing the rail wheels in the load-carrying position.

As illustrating a practical embodiment of this invention, the drawings show the coupling and transfer mechanisms thereof applied to a road-rail vehicle 10 and adapting such vehicle to be connected into a train for travel on railway rails, and for conversion or transfer of the vehicle to a condition for operation on roads or pavements. The vehicle 10 comprises a van body 11 mounted on a frame structure 12 which includes a longitudinal center sill 13, and a wheel suspension unit 14, the latter being connected with the frame structure 12 and having road wheels 15 and rail wheels 16.

The vehicle 10 is provided with rear and front couplers 17 and 18 of which the front coupler 18 is a male type coupler and the rear coupler 17 is of the socket or female type. The wheel suspension unit 14 supports the rear end of the vehicle 10 and also supports the front end of an adjacent vehicle when the front coupler 18 of the adjacent vehicle is engaged in the female coupler 17. The vehicle 10 also includes a prop means 20 for supporting the front end of the vehicle when the front coupler 18 has been disconnected from the rear coupler 17 of the adjacent vehicle or from a tractor unit.

The wheel suspension unit 14 is disclosed in detail in the copending application mentioned above and includes a transversely extending torsion spring means 21 and wheel arms connected with the torsion spring means and comprising road wheel arms 22 located on one side of the axis of such spring means and rail wheel arms 23 located on the opposite side of such axis. The road wheel arms 22 have the road wheels 15 mounted thereon and the rail wheel arms 23 have the rail wheels 16 mounted thereon. The road wheels and rail wheels 15 and 16 are selectively movable to a load-carrying position by swinging of their mounting arms by actuating movement transmitted to the arms through the torsion spring means.

Fig. 1 of the drawings shows the road wheels 15 in a lowered or load-supporting position for operation on the traction surface 25 which is the surface of a road or pavement. Fig. 2 shows the rail wheels 16 in the lowered or load-supporting position and in engagement with the rails 26 of a railway track. When one pair of the wheels is in the load-supporting position, the other pair is in a lifted position. The swinging movement imparted to the road wheel arms and rail wheel arms 22 and 23 for transferring from road operation to rail operation, and vice versa, is supplied by an auxiliary drive motor 27 which is suitably mounted on the depending portion 12a of the frame structure 12 of the vehicle and which, in this case, is an air motor operable by air pressure supplied thereto.

The motor 27 is a reversible motor and is drivingly connected with the torsion spring means 21 through cooperating screw and nut members 29 and 30 (see Fig. 6), of which the screw member is rotatably driven by the motor and the nut member is trunnioned on a swingable lever 31 projecting from the torsion spring means 21. Rotation of the screw member 30 in one direction by the motor 27 causes swinging of the lever 31 in a direction to lower the road wheels 15 and raise the rail wheels 16, and rotation of the screw in the opposite direction causes swinging of the lever in a direction to lower the rail wheels and lift the road wheels.

The center sill 13 extends for substantially the full length of the body 11 of the vehicle and is here shown as being of a tubular form. The rear coupler 17 is suitably connected to the rear end of the center sill 13 and is disposed with its socket facing rearwardly of the vehicle and accessible at the rear end of the frame structure 12. The front coupler 18 is suitably connected to the front end of the center sill 13 and projects forwardly of the vehicle body 11 and the frame structure 12 for engagement in the rear coupler of an adjacent vehicle.

Figure 7:
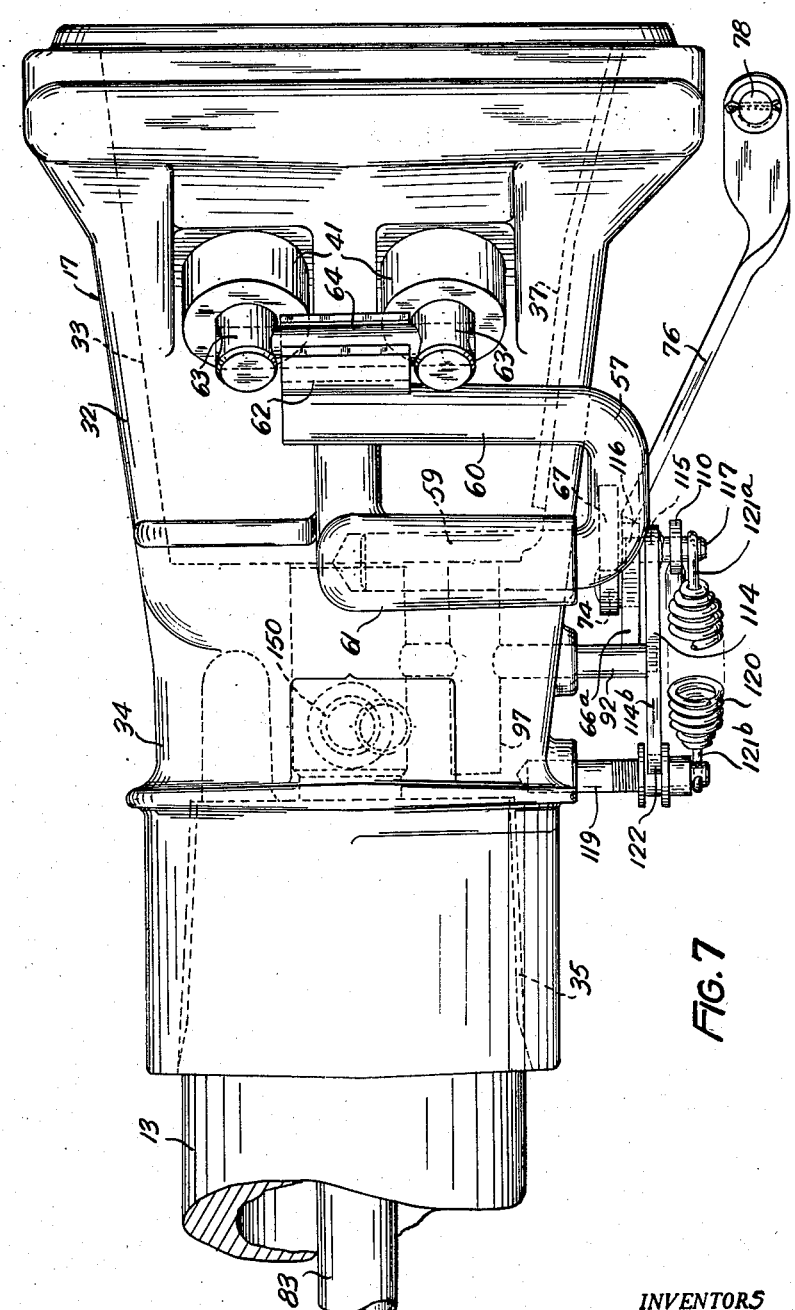
Fig. 7 is a side elevation of the female coupler of the road-rail vehicle.
Figure 8:
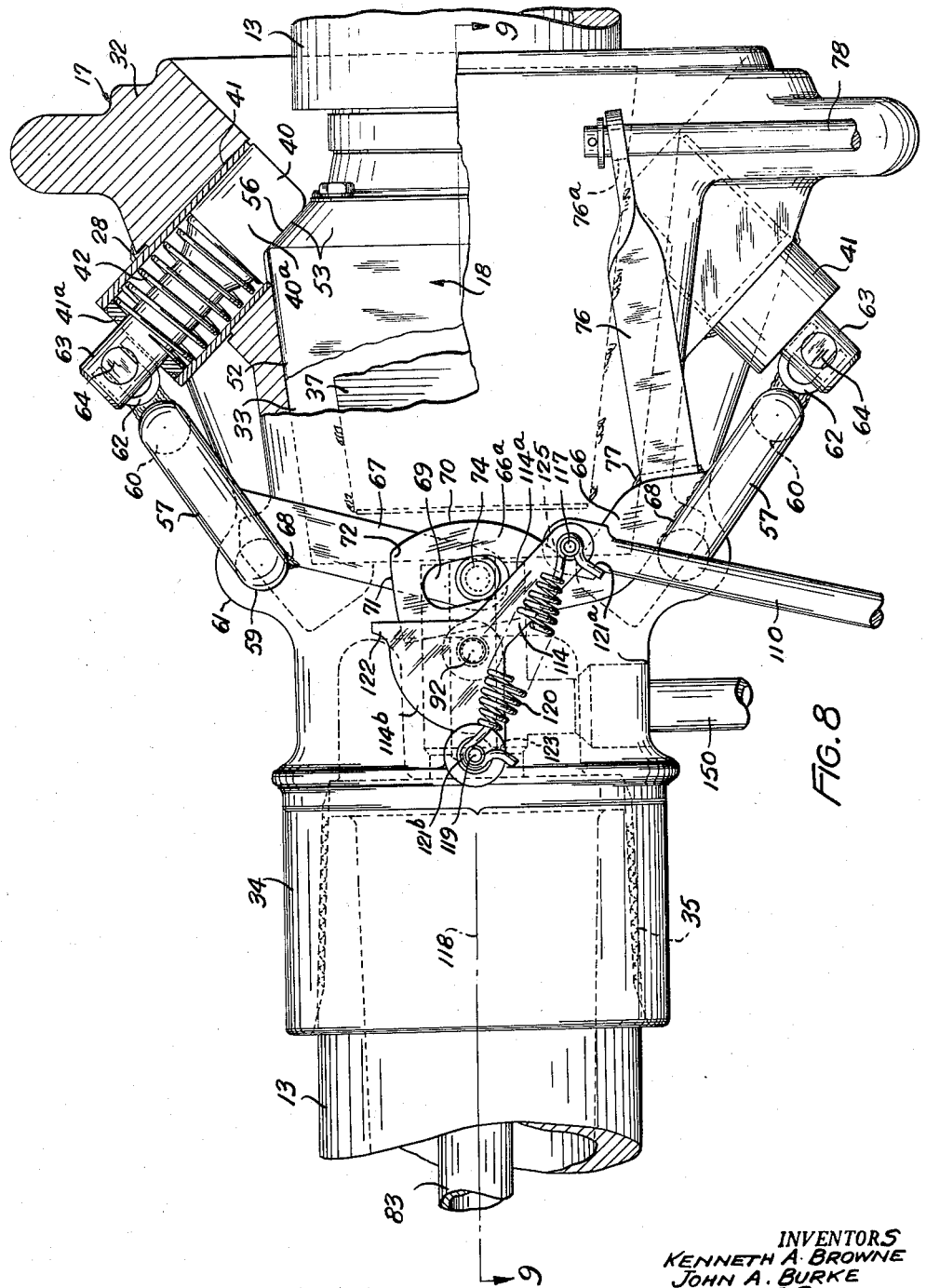
Fig. 8 is a bottom plan view of the coupler of Fig. 7 and showing the same with a male coupler engaged therein.

As shown in Figs. 7, 8 and 9, the rear or female coupler 17 comprises a coupler body 32 having a recess or socket 33 therein and a shank portion 34 which is here shown as having a threaded connection 35 with the center sill 13. The socket 33 has a forwardly or inwardly converging axial taper and is preferably of a quadrangular shape in cross-section transversely of the coupler body 32. The bottom wall 36 is preferably provided with a wear plate or liner 37 which is suitably secured thereto as by means of the welded connection 38.

The coupler 17 also comprises retaining means for retaining the male coupler 18 in an engaged relation in the socket 33 and which retaining means is here shown as comprising two pairs of plunger-like retaining members 40 projecting into the socket from opposite sides thereof. The retaining members or plungers 40 are movable in guide tubes 41 which are mounted in suitable openings of the coupler body 32 and form guideways in communication with the socket 33. The two pairs of guide tubes 41 are disposed with the axes thereof extending in a rearwardly or axially outward converging and intersecting relation. The guide tubes 41 are secured in the coupler body 32 as by the welds 28.

The retaining members 40 have a normal extended or retaining position projecting part-way into the socket 33, as shown in Fig. 8, and are urged toward this effective position by compression springs 42. One such spring is located in each of the guide tubes 41 and is disposed between the head portion 40$^a$ of the retaining member and the outer end wall 41$^a$ of the guide tube.

The front or male coupler 18 is shown in a disengaged relation in Figs. 11 and 12 and is of a size and shape to fit in the socket 33 of the coupler 17 when it is engaged with the latter, as shown in Fig. 8. The coupler 18 comprises a ball member 45 having a stem 46 attached to the center sill 13 as by a threaded connection 47, and an outer shell 48 mounted in a swiveled relation on the ball member. The shell 48 has a socket 49 therein for receiving the ball member 45 and includes a substantially semispherical internal bearing surface 49$^a$ in sliding engagement with a portion of the outer bearing surface of the ball member. The ball member 45 is retained in the socket 49 of the shell 48 by an end cover member 50 which is secured to the shell as by means of the screws 51.

The shell 48 has a generally quadrangular external shape corresponding in size with that of the socket 33 of the coupler 17 and also has a forward or axially outward converging external main taper corresponding with the axial converging internal taper of the socket 33.

The shell 48, when mounted on the ball member 45 as above described, provides the coupler 18 with a head portion 52 for engagement in the socket 33 of the coupler 17. At the rear end thereof, the shell 48 is provided with an oppositely extending axial taper of chamfer 53 which faces axially outwardly of the socket 33 when the coupler 18 is engaged in the latter.

When the coupler 18 is fully engaged in the socket 33 of the coupler 17, it occupies the position shown in Fig. 8 at which time the reverse taper or chamfer 53 lies just inwardly of the retaining members 40 and is engaged by the latter for preventing withdrawal of the coupler 18. The retaining members 40 are preferably provided with flats 56 on the inner axial side thereof and which lie against the chamfer 53 and afford an increased area of bearing contact with the latter. The coupler 18 is movable by impact to its coupled position in the coupler 17 and the external main taper of the head portion 52 facilitates the movement of the latter into the socket 33 and past the retaining members 40.

For actuation of the retaining members 40, the coupler 17 is provided with swingable U-shaped link members 57 on opposite sides thereof and each of which has a pair of spaced upright substantially parallel arms 59 and 60. The arm 59 is pivoted in a boss 61 of the coupler body 32 and the arm 60 carries a rigidly connected yoke 62 which is located adjacent the outer ends of the pair of guide tubes 41. The retaining members 40 are provided with stems 63 which project through the rear walls 41$^a$ of the respective guide tubes 41. Each pair of such stems 63 is connected with a yoke 62 by a pin 64 extending through the stems and lying in recess 62$^a$ of the yoke.

From the construction and arrangement of the U-shaped link member 57 as described just above, it will be seen that swinging of this link member about the axis of the arm 59 thereof as a pivot axis, will cause the associated pair of retaining members 40 to be retracted in their guide tubes 41, in opposition to the compression springs 42. The link members 57 are interconnected for simultaneous swinging, so as to cause simultaneous retraction of the pairs of retaining members 40 on opposite sides of the coupler socket 33, and for this purpose, the link members have inwardly projecting levers 66 and 67 secured thereto as by welded connections 68 and which levers extend into an overlapping relation as shown in Fig. 8.

The inner end of the lever 66 forms a cam member 66$^a$ which has a slot 69 therein and also has a curved cam edge 70. The cam edge 70 terminates at a radiused end face 71 provided on the free end of the lever 66 and forms with such end face an included control corner 72 whose purpose is explained hereafter. The cam member 66$^a$ lies beneath the free end of the lever 67.

The lever 67 is provided adjacent the free end thereof with a projecting pin 74 which extends downwardly into the slot 69 and is relatively shiftable along the latter. The pin and slot elements 74 and 69 of the levers 66 and 67 thus form a connecting means between the swingable link members 57 and transmit motion between these link members for causing simultaneous actuation thereof.

Figure 3:
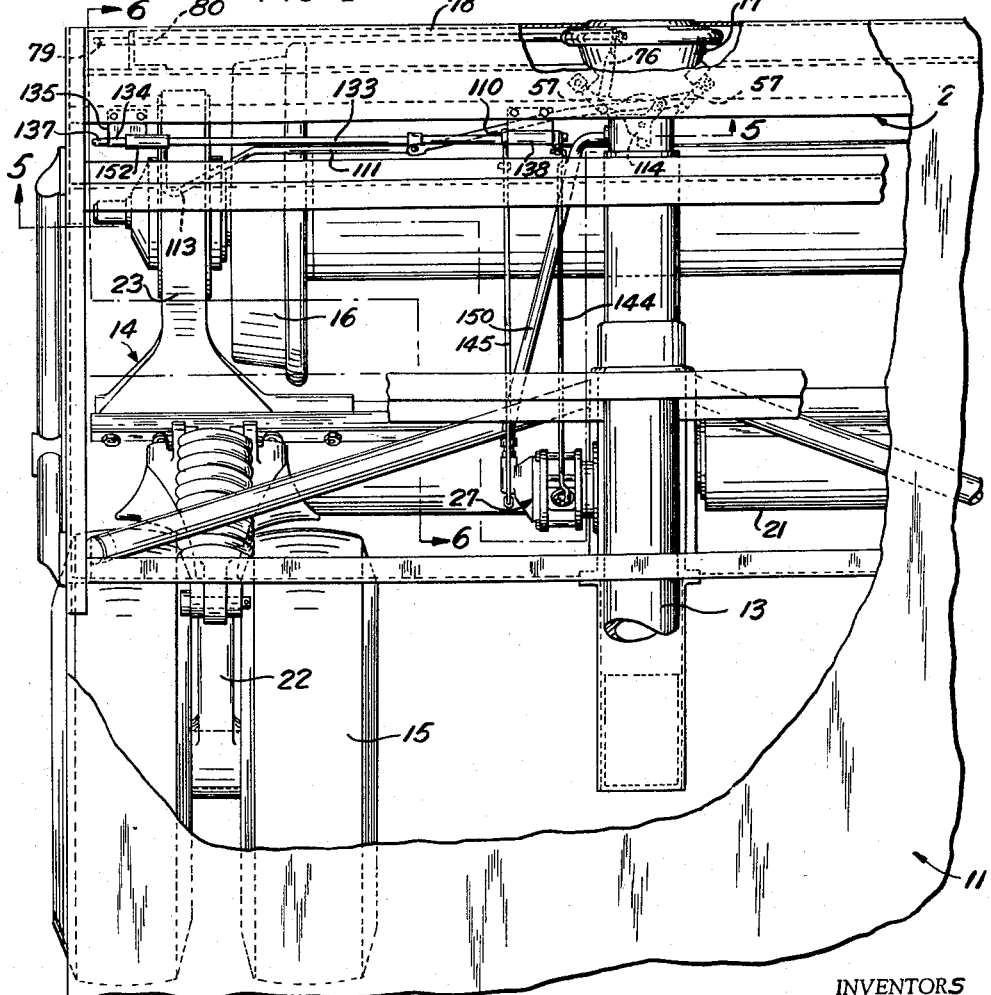
Fig. 3 is a partial plan view of the wheel suspension of the road-rail vehicle and also showing the arrangement and location of the controls for the coupling and transfer mechanisms, portions of the vehicle structure being broken away.
Figure 4:
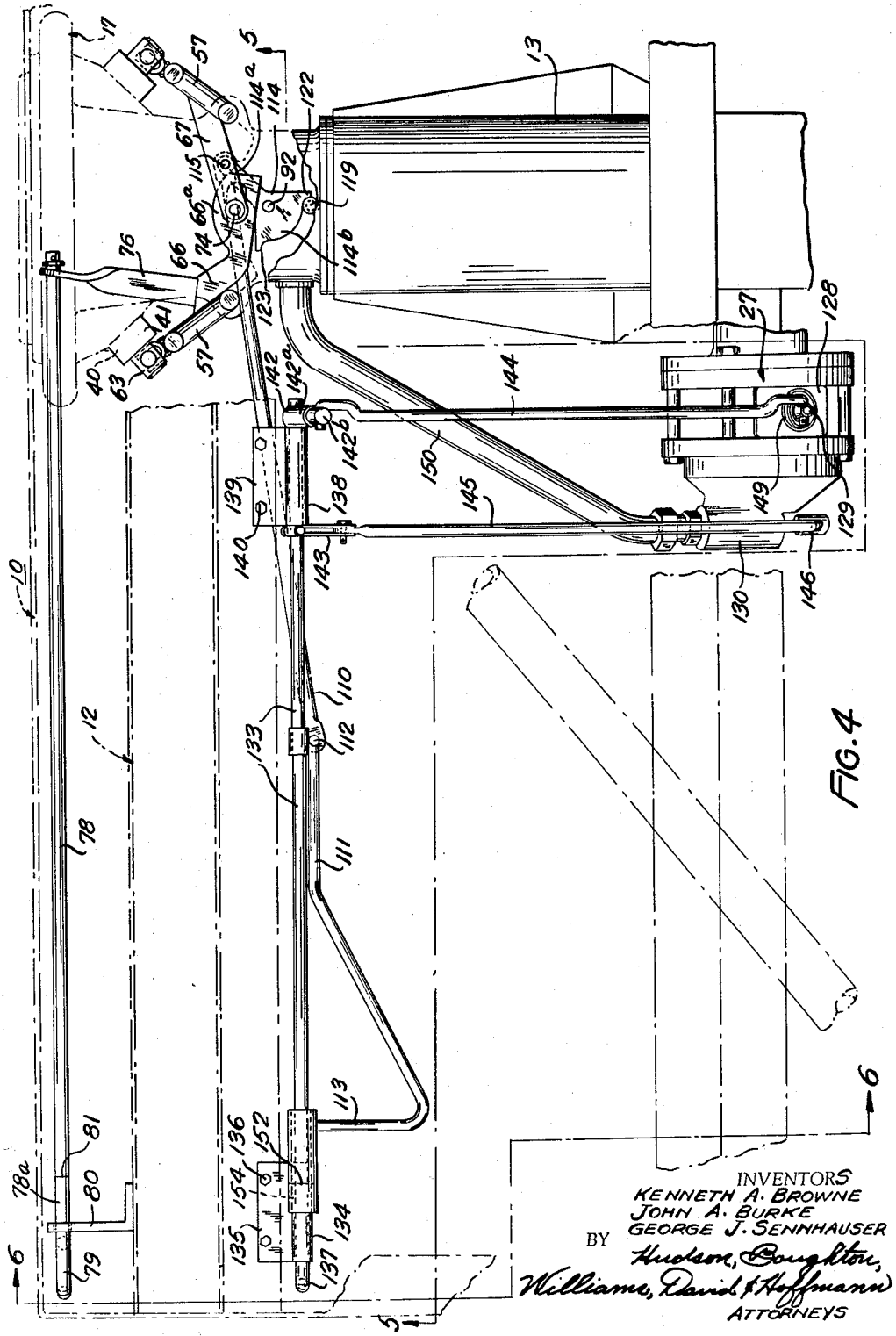
Fig. 4 is a partial plan view further illustrating the controls of the coupling and transfer mechanisms, the view being similar to that of Fig. 3 but on a larger scale and with certain portions of the vehicle structure omitted and other portions thereof shown in phantom.
Figure 5:
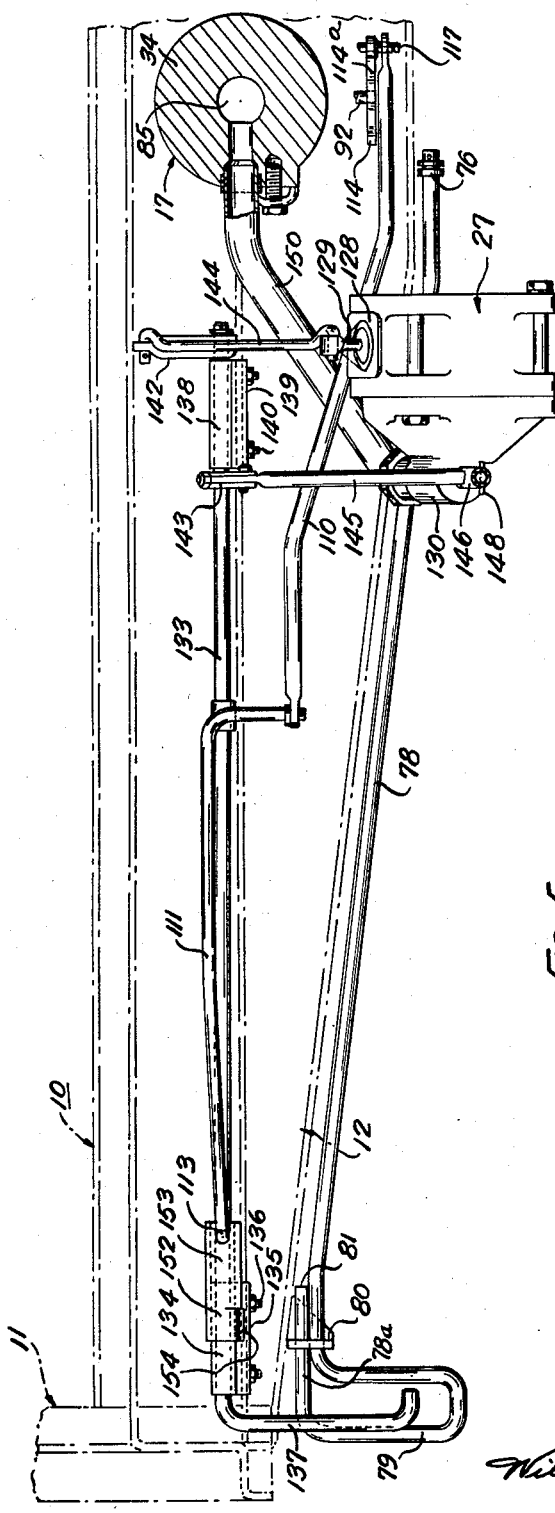
Fig. 5 is a transverse elevational view, with portions in section and with certain portions of the vehicle structure omitted, showing the controls for the coupling and transfer mechanisms as seen when viewed as indicated by the directional line 5—5 of Figs. 3 and 4.

Manually operable actuating means is provided for releasing the coupler 17 to permit the withdrawal or uncoupling of the coupler 18 therefrom, and such actuating means is shown in Figs. 3 to 9 as including a lever 76. The lever 76 projects angularly from the lever 66 and is rigidly secured to the latter in such angular relation by the weld 77 as shown in Figs. 8 and 9. The coupler releasing means also comprises a pull-rod 78 extending outwardly from the coupler 17 and in a direction transversely of vehicle 10 as shown in Figs. 3, 4 and 5. The rod 78 has its inner end extended through, and flexibly connected with, the lever 76 and is provided at its outer end with a suitable hand grasp portion or handle 79. The rod 78 is suitably supported and guided adjacent its outer end by a bracket 80 mounted on the frame structure 12 of the vehicle 10.

A manual pulling force in an outward direction applied to the handle 79 of the rod 78 will cause retraction of the retaining members 40 for releasing the coupler 17 to permit the withdrawal of the coupler 18 therefrom. The handle 79 is formed on the rod 78 so that the reversely extending rod portion 78$^a$ lies alongside of the rod on the upper side thereof with the free end of the doubled rod portion forming a latch member or abutment element 81. The bracket 80 also forms a stop for releasable engagement by the element 81 for latching the rod 78 in its actuated position for holding the coupler 17 open. The bracket 80 has a guide opening therein of a vertical width to accommodate the double-thickness portion of the rod 78 so that the rod can be lifted enough to engage the element 81 with the bracket when this element has been withdrawn from the bracket opening.

The vehicle 10 is provided with suitable supply means for air under pressure and which air supply means is here represented by a train pipe 83. The train pipe 83 is shown as extending longitudinally in the hollow center sill 13 and has its opposite ends connected respectively with passages of the couplers 17 and 18 so as to provide a through passage for the air pressure supply when the couplers are in their engaged relation as shown in Fig. 8.

The train pipe end 83ª which extends to the coupler 17 communicates with an axial passage 85 provided in the latter and the connection of the pipe and with this passage is sealed by a suitable sealing bushing or coupling 86. The passage 85 is provided at the outer end thereof with another sealing bushing or coupling 87 having a packing portion 88 which projects axially into the coupler socket 33.

At the inner end thereof, the sealing bushing 87 is provided with an annular seat 89 forming a part of a shut-off valve device or angle cock 90. The valve device 90 also includes a rotatable ball-shaped valve member 91 which is in a slidably co-operating engagement with the seat portion 89 of the sealing bushing 87 and is actuatable by a pivot stem 92.

The valve actuating stem 92 is rotatable in an opening 93 of the coupler body 32 and is drivingly connected with the valve member 91 as by a pin 94 of the latter lying in a slot 95 of the stem. Along the intermediate portion thereof, the stem 92 is provided with flats 96 on opposite sides thereof and the flatted portion of this stem extends across an axial guide passage 97 provided in the coupler body 32.

The coupler 18 is provided with a central axial passage 100 in the ball member 45 and the end 83ᵇ of the train pipe 83 extends into this central passage as shown in Fig. 12. A sealing bushing or gland 101 is threadedly engaged in the forward end of the ball member 45, and the train pipe end 83ᵇ extends into this gland and is sealed against leakage by a suitable packing 102 which is subjected to compression by the gland. A suitable packing ring 103 is disposed in a groove provided in the ball member 45 in surrounding relation to the gland 101 and is in sealing engagement with the internal spherical bearing surface 50ª of the cover member 50 for preventing leakage of air pressure between the ball member and the cover member.

The passage 101ª of the gland 101 and an opening 104 provided in the cover member 50 are axially aligned with the train pipe end 83ᵇ and form a continuation of the air passage of the latter. When the coupler 18 is fully engaged in the coupler 17, the projecting packing portion 88 presses against the face of the cover member 50 in surrounding relation to the passage 104 of the latter, whereby this packing portion forms a sealed connection between the air passages of the two couplers.

The coupler 17 is provided with a first lock means for preventing opening actuation of the shut-off valve member 91 except when the coupler 18 is fully engaged in the socket 33 and, for this purpose, a plunger 106 is slidably located in the guide passage 97 and co-operates with the flatted portion 96 of the valve stem 92 as a preventer member. As shown in Fig. 10, the plunger 106 is provided with a longitudinal slot 107 which, at one point of its length, is of a width only slightly greater than the flatted portion 96 of the valve stem 92 and forms a locking recess 107ª for preventing rotation of the valve stem. At another point of the length thereof, the slot 107 is of a somewhat greater width than the diameter of the valve stem 92 and permits a free rotation of the flatted portion 96. A compression spring 108 located in a blind end 97ª of the guide passage 97 acts on the plunger 106 and continuously urges the latter in a direction to extend or project the free end of the plunger into the coupler socket 33 as shown in Fig. 9.

Normally, whenever the coupler 18 is withdrawn from the socket 33, the preventer 106 is in its projected relation and the valve member 91 is in its closed position in which it is then being held by the locking action of the slot portion 107ª on the flatted portion 96 of the valve stem 92. When the coupler 18 is engaged or re-engaged in the socket 33, the plunger 106 is pushed inwardly of the guide passage 97 against the action of the spring 108 thereby moving the clearance recess portion 107ᵇ of the plunger into a surrounding relation to the flatted portion 96 of the valve stem 92 to permit a free rotation of the latter for rotating the valve member 91 to its open position shown in Fig. 9.

The vehicle 10 is provided with manually operable means for actuating the valve member 91 to the above-explained open and closed positions and which manually operable means includes rod members 110 and 111 extending away from the coupler 17 and toward the same outer side of the vehicle as that on which the handle 79 of the coupler releasing means is located. The rod 111 has its inner end connected to the outer end of the rod 110 by a pivot connection 112 which permits limited swinging of the latter rod member during the actuation of the valve member 91. A handle 113 is provided on the outer end of the rod 111 and may be formed by a bent portion of this rod.

The manually operable means for actuating the valve member 91 also includes a lever 114 fixed on the lower or outer end of the valve stem 92, as shown in Figs. 8 and 9. The lever 114 also constitutes a locking lever as hereinafter explained and carries a pin 115 which is fixed in an arm 114ª of this lever adjacent the outer end of such arm. The pin 115 has one end thereof projecting above the arm 114ª as a follower element 116 for co-operation with the cam edge 70 of the lever 66 and its other end projecting from the lower side of the arm 114ª and forming a pivot pin projection 117. The inner end of the rod 110 is pivotally connected with the arm 114ª by means of the depending pivot pin projection 117 of the latter.

Pushing and pulling manual forces applied to the handle 113 will be transmitted through the rods 111 and 110 to the lever 114 to cause swinging of the latter for closing or opening the valve member 91. When the lever 114 is in the position shown in Fig. 4 the valve 90 is closed, and when the lever 114 is in the position shown in Fig. 8 the valve is open. As also shown in Fig. 8, the valve stem 92 is located substantially on the central longitudinal axis 118 of the coupler 17 and the swinging of the arm 114ª to actuate the valve member 91 to its open and closed positions causes movement of the pin 115 across this central axis and through a dead-center position.

At a point adjacent the valve stem 92, the coupler 17 is provided with an anchor and abutment pin 119. A tension spring 120 is provided for holding the valve member 91 in either its open or closed position to which it has been manually moved and this spring has its opposite ends secured on the pins 115 and 119 by means of hook elements 121ª and 121ᵇ. The pin 119 also forms a limit stop for the valve actuating lever 114 and is engageable by arcuately spaced abutment projections 122 and 123 of the sector arm 114ᵇ when this lever is swung to one or the other of its valve-actuating positions corresponding with the closed and open positions of the valve member 91. By reason of the engagement of its hook-shaped ends 121ª and 121ᵇ on the pins 115 and 119, the spring 120 also serves as a means for retaining various parts of the coupler mechanism in their assembled relation.

The pin projection or follower element 116 of the valve actuating lever 114 co-operates with the cam member 66a of the lever 66 to form a second lock means for preventing a release actuation or opening of the coupler 17 when the valve member 91 is in its open position. This second lock also prevents any accidental release of the coupler. In Fig. 8 of the drawings this second lock means is shown in its effective condition for preventing such release actuation of the coupler 17 and, at this time, the follower element 116 is at the inner end of the cam member 66a and lies in a locking recess 125 which is formed at the junction of the convex cam edge 70 with the straight portion of the lever 66.

As will be seen from Fig. 8, the presence of the locking recess 125 in the lever 66 gives this lever a hook-like shape, such that swinging of the lever in a direction to cause retraction of the retaining members 40 for opening the coupler 17 will be prevented by the follower element 116. At this time the second lock means just described above prevents swinging of the link members 57 by the application of an outward pulling force to the handle 79 of the coupler release rod 78.

When the coupler 17 is to be released for the disengagement of the coupler 18 therefrom, it is first necessary to actuate the valve member 91 to its closed position to prevent the loss of air from the train pipe 83 and this closing actuation of the valve member by swinging of the lever 114 also causes actuation of the second lock means to an ineffective condition to permit the retraction of the retaining members 40. Thus, an inward pushing force applied to the handle 113 of the outer rod 111 is transmitted by the inner rod 110 to the lever 114 and causes swinging of the latter in a counterclockwise direction as seen in Fig. 8. This swinging of the lever 114 causes the follower element 116 to be moved along the cam edge 70 to a point beyond the corner 72, whereupon the lever 66 can be swung without interference by the follower element and the link members 57 will cause retraction of the retaining members 40.

During such counterclockwise swinging of the lever 114, the follower element 116 moves across the longitudinal center line 118 of the coupler and through its dead-center position, whereupon the tension spring 120 will assist the movement of the follower element to, and retain the same in, its releasing or unlocking position beyond the corner 72. Similarly, the spring 120 will retain the follower element 116 in the locking recess 125 when the lever 114 has been swung to the valve-open position shown in Fig. 8.

The relationship of the curved cam edge 70 and the relatively flatter end face 71 is that they conform to two arcs whose intersection forms the control corner 72. These curved portions 70 and 71 are so formed that the follower element 116 will not pass around the control corner 72 unless the retaining members 40 of the coupler 17 have been extended to a fully coupled position. Therefore, if a fully coupled condition has not been achieved, the inability of the follower 116 to move around the control corner 72 will provide an indication of the improper or faulty coupling condition, and moreover, the valve member 91 will not be movable to its open position.

As the coupler 18 is withdrawn from the socket 33 of the coupler 17, the plunger 106 is released for movement into the pocket and along the guideway 97 under the influence of the spring 108. Since the valve member 91 at this time is in its closed position, the flatted portion 96 of the valve stem 92 will be in a setting relative to the slot 107 of the plunger to be straddled by the locking portion 107a of the slot. The plunger 106 will thereupon lock the valve stem 92 in the rotative position corresponding with the closed condition of the valve member 91 and will prevent opening movement of this valve member by the lever 114 and the rods 110 and 111 until the plunger 106 has again been pushed inwardly of the guide passage 97.

It will thus be seen that so long as a coupler 18 is not engaged in the pocket 33 of the coupler 17, the valve member 91 will be locked in its closed position by the first lock means and will be held against actuation to its open position which would result in an undesirable loss of air from the train pipe 83. It will also be seen that the first lock means and the second lock means are interconnected through the valve stem 92 so that whenever the valve member 91 is in its open position, the second lock means will be in its locked condition with the follower element 116 lying in the locking recess 125 of the lever 66, as shown in Fig. 8. Thus, engagement of the coupler 18 in the coupler 17 is ordinarily necessary for releasing the first lock means before the valve member 91 can be moved to its open position, and when the couplers 17 and 18 are in a coupled relation and the valve member 91 is in its open position, it is necessary to unlock the second lock means by moving the valve member 91 to its closed position before the coupler 17 can be released by a pulling actuation of the handle 79.

It is also important that the interconnected relation provided between the first lock means and the second lock means effectively prevents any improper coupling procedure sequence by which the coupler mechanism could be damaged. Thus whenever the coupler socket 33 is empty, the first lock means is in a condition to be actuated to an unlocked condition without damage, by the entering coupler 18 and the second lock means is then in its unlocked condition to permit the retaining members 41 to be pushed open without damage, by the entering coupler head 52. The actuation of the valve member 91 to its open position after engagement of the coupler 18 in the socket 33, causes locking of the second lock means.

Figure 6:
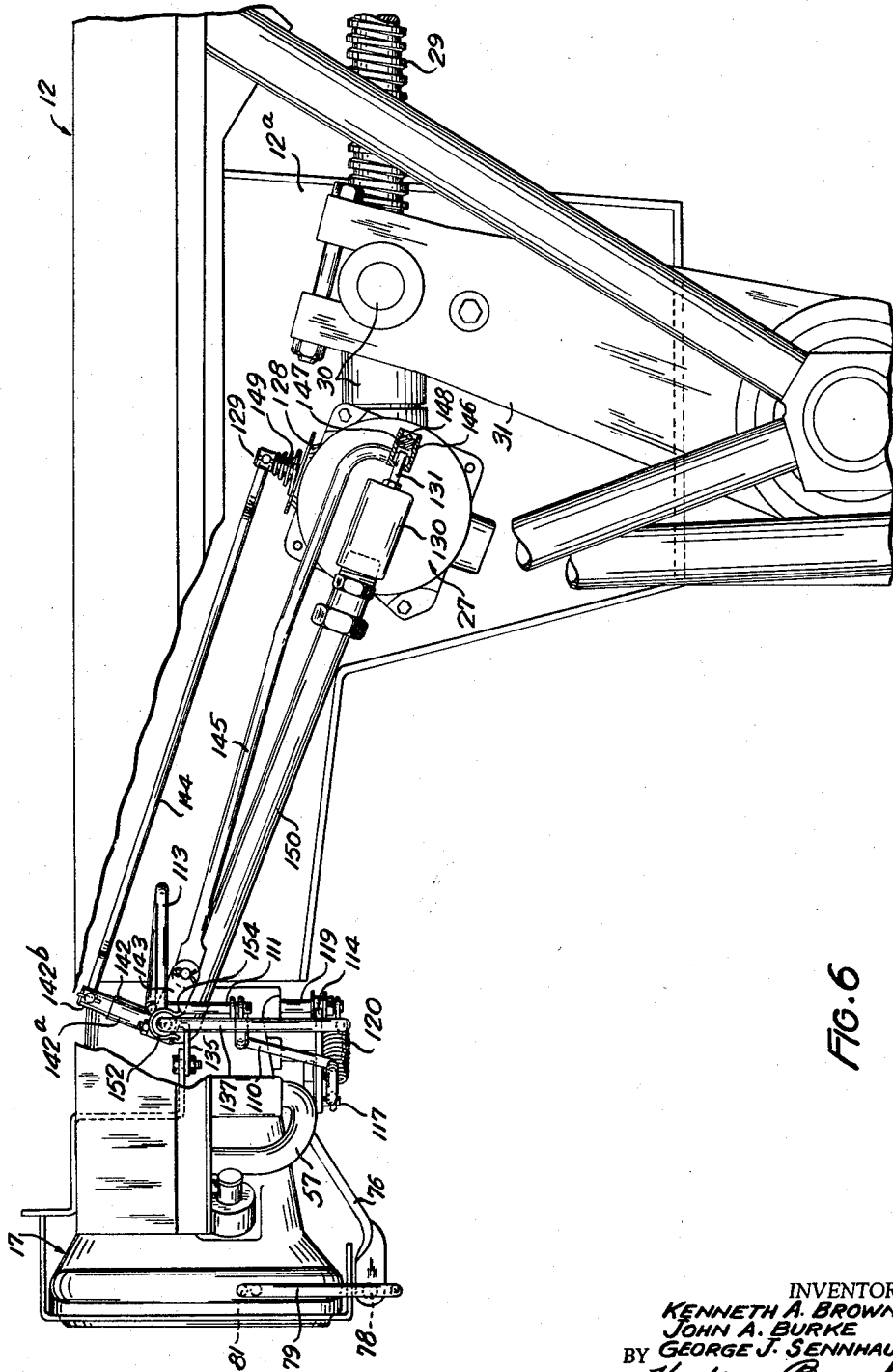
Fig. 6 is a side elevational view, with portions of the vehicle structure omitted, showing the coupling and transfer mechanisms and their associated controls, when viewed as indicated by the directional line 6—6 of Figs. 3 and 4.

Reverting now to the transfer motor 27, it should be explained that this motor is controlled by suitable control valve means which, in this case, is housed on the motor itself and which comprises a reversing valve means 128 having an actuating stem 129 and a throttle valve means 130 having an actuating stem 131. The reversing valve means 128 is here shown as having its actuating stem 129 projecting radially from the periphery of the housing of the motor 27 and adapted for limited tilting relative to the housing for shifting of the setting of the reversing valve means from one to the other of its positions for controlling the direction of operation of the motor. The actuating stem 129 is shown in Fig. 6 of the drawings as being in its intermediate or neutral position. The actuating stem 131 of the throttle valve means 130 is a reciprocable stem and is here shown as being located at one end of the motor 27 and projecting in a radially transverse direction relative to the axis of the motor. The stems 129 and 131 project from the motor 27 in a substantially 90° angular relation to each other.

The vehicle 10 is also provided with manually operable means for actuating the reversing valve means 128 and the throttle valve means 130 and which manually operable means extends to and is effective on the valve stems 129 and 131 in a sequential manner. This manually operable means is here shown as including a pivot shaft 133 extending inwardly from the same side of the vehicle as that on which the handle 79 of the coupler release means is located and which pivot shaft is also located immediately adjacent the outer rod 111 of the manually operable means for actuating the shut-off valve 91.

The pivot shaft 133 is rotatably supported adjacent its outer end by a bearing sleeve 134 of a bracket 135 which is suitably attached to the vehicle by the bolts 136. The outer end of the pivot shaft 133 projects beyond the bearing sleeve 134 and is provided with a depending handle 137. At the inner end thereof, the pivot shaft 133 is rotatably supported by a bearing sleeve 138 of a bracket 139 which is secured to the vehicle by bolts 140.

To utilize the pivotal movement of the shaft 133 for actuating both the reversing valve means 128 and the throttle valve means 130, the pivot shaft is provided with a pair of levers 142 and 143 which are secured thereon at points on opposite sides of the bearing sleeve 138 and in a substantially 90° angular relation to each other as shown in Fig. 6. The lever 142 is connected with the stem 129 of the reversing valve means 128 by a push-pull link 144 and the lever 143 is connected with the stem 131 of the throttle valve means 130 by a push-pull link 145.

The lever 142 is of a flexible character so that it will yield after it has caused actuation of the stem 129 to the extent of the limited tilting movement of the latter. To provide such flexibility, the lever 142 is here shown as comprising lever members 142$^a$ and 142$^b$ of which the lever member 142$^b$ is extensibly movable relative to the lever member 142$^a$ and is telescoped into the latter. The lever member 142$^b$ is normally extended from the lever member 142$^a$ by suitable spring means contained in the lever assembly but is movable to a lever-shortening position when the stem 129 reaches the limit of its tilting movement so that the further rotation of the pivot shaft 133 can be utilized to actuate the throttle valve means 130 by the lever 143.

The throttle valve means 130 is preferably of the type which is spring actuated to its closed position and is movable to its open position by an inward axial movement of the stem 131 in opposition to such spring means. The outer end of the link 145 is connected with the stem 131 by connecting means which provides a desired amount of lost motion between the link and the stem. For this purpose, the outer end of the link 145 is provided with a socket 146 into which the outer end of the valve stem 131 projects for engagement by a thrust block 147 adjustably positioned in the socket with a desired amount of clearance space between the adjacent ends of the valve stem and the thrust block. The thrust block 147 can be threadedly engaged in the socket 146 and retained in the desired position of adjustment by a cotter pin 148.

From the arrangement above described for the valve stems 129, 131 and for the levers 142, 143 and the links 144, 145 it will be seen that the initial manual rotation of the pivot shaft 133 will, through action of the lever 142, be effective only on the valve stem 129 of the reversing valve means 128 and will cause shifting of the reversing valve means to a setting appropriate for the desired direction in which the motor 27 is to run for transferring the wheel suspension of the vehicle from a road-wheel setting to a rail-wheel setting or vice versa. The succeeding rotary movement of the pivot shaft 133 will cause swinging of the lever 143 away from its dead-center position shown in Fig. 6, whereupon this lever will become effective in transmitting a pulling force through the link 145 causing the latter to push the valve stem 131 inwardly and produce opening actuation of the throttle valve means 130. The opening of the throttle valve means 130 will thereupon cause operation of the motor 27 in the direction for which the reversing valve means 128 has just previously been set and the operation of the motor will cause swinging of the wheels of the wheel suspension 14 for transferring the vehicle from road-wheel operation to rail-wheel operation or vice versa. The flexible character explained above for the lever 142 permits overtavel of this lever while the throttle valve means 130 is being actuated by the lever 143.

When the transfer operation has been completed the pivot shaft 133 is rotated manually back to its initial position corresponding with that shown in Figs. 4 and 6 which leaves the throttle valve means 130 in its closed position and the reversing valve means 128 in its neutral position. During such manual actuation of the pivot shaft back to its initial position, the swinging of the lever 143 will become progressively less effective as this lever moves toward its dead-center position shown in Fig. 6 and, by the time that this lever arrives at such dead-center position, the throttle valve means will be in its closed position and the lever 142 will have resumed its contracted or collapsed condition and the stem 129 will have been returned to its intermediate position corresponding with the neutral setting of the reversing valve means 128. The return of the stem 129 to the neutral setting is produced or assisted by a conical wire spring 149 surrounding the same.

The supply of air under pressure for actuating the motor 27 is obtained from the train pipe 83 as by means of a supply pipe 150 extending to the throttle valve means 130 from the coupler 17. The supply pipe 150 is in continuous communication with the train pipe 83 through the air passage 85 of the coupler body 32.

In accordance with the present invention, a third lock means is provided on the vehicle 10 for the manual means which actuates the control valve means of the motor 27. This third lock means prevents actuation of the control valve means to cause running of the motor 27 until the valve member 91 of the shut-off valve means 90 has been actuated to its closed position. It will therefore be seen that the wheel suspension 14 cannot be swung by the motor 27 to transfer from a road-wheel setting to a rail-wheel setting, or vice versa, except when the valve member 91 is in its closed position.

This third lock means comprises a yoke 152 formed on or carried by a shift sleeve 153 slidably mounted on the bearing sleeve 134 of the bracket 135. The outer end of the rod 111 of the manually operable means for actuating the valve lever 114 forms the handle 113 and is connected with the shift sleeve 153 so that when a pushing force is applied to the rod for causing closing of the valve member 91, the yoke 152 will be moved in an inward direction along the bearing sleeve 134. Conversely when a pulling force is applied to the handle of the rod 111 for moving the valve member 91 to its open position, the yoke 152 will be moved in the opposite direction, that is outwardly along the bearing sleeve 134.

The yoke 152 has an open slot in the underside thereof so as to provide thereon a pair of spaced locking fingers 154 which straddle the handle 137 of the pivot shaft 133 when the yoke 152 has been moved to a locking position outwardly of the end of the bearing sleeve 134. When the locking fingers 154 are in such a straddling position relative to the handle 137, they prevent swinging of the latter in either direction from its intermediate or neutral position in which it is shown in Figs. 4 and 6. While the fingers 154 are in this locking position, they hold the handle 137 against swinging and thus prevent any pivotal movement of the shaft 133, and consequently, lock the latter against causing any actuation of the control valve means of the motor 27.

When the yoke 152 is in its outer or locking position as just described, this third lock means renders the motor 27 inoperative and prevents any transfer actuation of the wheel suspension 14 of the vehicle. When the yoke 152 is moved along the bearing sleeve 134 to its inward or retracted position shown in Figs. 4 and 5 and which movement is caused by the closing actuation of the valve member 91 by a manual pushing force applied to the handle 113, the locking fingers 154 release the handle 137 of the pivot shaft 133. The pivot shaft can then be rotated by swinging of the handle 137 to cause operation of the motor 27 as already explained above.

Fig. 13 shows a modified form of coupler release means which can be used to advantage in place of the coupler release means 78, 79 described, for releasing the coupler 17. This modified releasing means comprises a similar pull rod 155 and handle 156 but the operating connection between the pull rod and the swingable link 57 of the coupler 17 is differently formed and employs co-operating levers 157 and 158. The lever 157 is rigid with the link 57, as by being welded thereto, and corresponds with the lever 77 of Fig. 4 but the lever 158 is an added lever.

The lever 158 is a bell crank lever having one end thereof swingably attached to the vehicle frame 12 by a pivot bracket 159 and having its other or free end pivotally engaged by the inner end of the pull rod 155. The lever 158 carries a latch pin 160 which is engageable in, and releasable from, a latch recess 161 provided in the lever 157 as a holding means for temporarily holding the retaining members 40 of the coupler 17 in an intermediate or partially retracted position after the coupler 17 has been released and the coupler 18 has been withdrawn therefrom.

The components of this modified coupler release means are so proportioned and arranged that when a manual pulling force is applied to the handle of the rod 155 to release the coupler 17, the lever 158 will be swung to first actuate the lever 157 to retract the retaining members 40, and to then cause the latch pin 160 to engage in the latch recess 161. When the handle 156 is released by the operator, the latch pin 160 will limit the return swinging movement of the bell crank lever 158 so that the retaining members 40 will be held in the above mentioned partially retracted position. When the coupler 18 is re-engaged in the coupler 17, it will first act to push the retaining members 40 outwardly which will react through the link 57 and the lever 157 to cause movement of the latter in a direction to release the latch pin 160 from the recess 161.

It will accordingly be seen that the modified coupler release means of Fig. 13 is self-tripping in character and will not need any attention or act on the part of the operator to cause the coupler 17 to become fully coupled when the coupler 18 is reengaged therein.

From the accompanying drawings and the foregoing detailed description it will now be readily understood that this invention provides novel coupling and transfer control mechanism for a road-rail vehicle by which the release of the coupler of the vehicle and the running of the transfer motor will be controlled in a practical and expeditious manner such that loss of air from the train pipe or damage to the coupler mechanism will be prevented, as well as an improper or ultimely transfer actuation of the road wheels and the rail wheels of the wheel suspension.

Although the coupling and transfer control mechanism of this invention has been illustrated and described herein in a somewhat detailed manner, it will be understood that the invention is not to be regarded as being limited correspondingly in scope but includes all changes and modifications coming within the terms of the claims hereof.

Having described our invention, we claim:

1. In transfer mechanism for a road-rail vehicle having road wheels and rail wheels selectively shiftable to a load carrying position for transferring from road operation to rail operation and vice versa, and means for causing such shifting of the wheels including a reversible air motor; air supply means on said vehicle and extending to said motor; control valve devices connected between said air supply means and motor comprising a reversing valve means and a throttle valve means having actuating stems extending in a substantially 90 degree angular relation to each other; a manually actuatable pivoted shaft; a pair of levers attached to said shaft for swinging thereby and disposed in a substantially 90 degree angular relation to each other; and link means comprising a pair of links operably connected between said levers and stems for causing actuation of said valve devices in response to pivotal movement of said shaft; the link associated with one of said levers being connected with one of said stems and the link associated with the other of said levers being connected with the other of said stems.

2. Transfer mechanism as defined in claim 1 and wherein said link means comprises push-pull link means; said reversing valve means being actuatable by one of said levers and the associated link in response to one portion of the pivotal movement of said shaft and said throttle valve means being actuatable by the other of said levers and the associated link in response to another portion of the pivotal movement of said shaft.

3. In coupling and transfer mechanism for a road-rail vehicle having road wheels and rail wheels selectively shiftable to a load carrying position for transferring from road operation to rail operation and vice versa, and means for causing such shifting of the wheels including an air motor and control valve means controlling the operation of the motor; releasable coupler means on said vehicle; air-supply train pipe means extending to said coupler means; conduit means connecting said motor with said train pipe means; shut-off valve means associated with said coupler means for controlling said train pipe means and having open and closed positions; and manually operable means on said vehicle for releasing said coupler means and for causing a sequential actuation of said shut-off valve means and said control valve means; said manually operable means comprising actuating members operably connected with said coupler means, said shut-off valve means and said control valve means and extending to a common operating location on the vehicle.

4. In coupling and transfer mechanism for a road-rail vehicle having road wheels and rail wheels selectively shiftable to a load carrying position for transferring from road operation to rail operation and vice versa, and means for causing such shifting of the wheels including an air motor and control valve means controlling the operation of the motor; releasable coupler means on said vehicle; air-supply train pipe means extending to said coupler means; conduit means connecting said motor with said train pipe means; shut-off valve means associated with said coupler means for controlling said train pipe means and having open and closed positions; manually operable means on said vehicle for releasing said coupler means and for causing a sequential actuation of said shut-off valve means and said control valve means; said manually operable means comprising actuating members connected with said coupler means, said shut-off valve means and said control valve means and extending to a common operating location on the vehicle; and lock means operatively associated with and responsive to said manually operable means for preventing release of said coupler means except when said shut-off valve means is in said closed position; said lock means being actuatable to locking and releasing conditions by one of the members of said manually operable means.

5. In coupling and transfer mechanism for a road-rail vehicle having road wheels and rail wheels selectively shiftable to a load carrying position for transferring from road operation to rail operation and vice versa, and means for causing such shifting of the wheels including an air motor and control valve means controlling the operation of the motor; releasable coupler means on said vehicle; air-supply train pipe means extending to said coupler means; conduit means connecting said motor with said train pipe means; shut-off valve means associated with said coupler means for controlling said train pipe means and having open and closed position; manually operable means on said vehicle for releasing said coupler means and for causing a sequential actuation of said shut-off valve means and said control valve means; said manually operable means comprising actuating members operably connected with said coupler means, said shut-off valve means and said control valve means and extending to a common operating location on the vehicle; and lock means operatively associated with and responsive to said manually operable means for preventing actuation of said control valve means except when said shut-off valve means is in said closed position; said lock means being actuatable to locking and releasing conditions by movement of that member of said manually operable means which is connected with said shut-off valve means.

6. In coupling and transfer mechanism for a road-rail vehicle having road wheels and rail wheels selectively shiftable to a load carrying position for transferring from road operation to rail operation and vice versa, and means for causing such shifting of the wheels including an air motor and control valve means controlling the operation of the motor; releasable coupler means comprising co-operating coupler members at least one of which is mounted on said vehicle; said coupler members being connectable by impact and separable upon release actuation of the coupler means; air-supply train pipe means extending to said one coupler member; conduit means connecting said motor with said train pipe means; shut-off valve means associated with said one coupler member for controlling said train pipe means and having open and closed positions; manually operable means on said vehicle for releasing said coupler means and for causing a sequential actuation of said shut-off valve means and said control valve means; said manually operable means comprising actuating members operably connected with said coupler means, said shut-off valve means and said control valve means and extending to a common operating location on the vehicle; and lock means for preventing actuation of said shut-off valve means to said open position except when said coupler members are in their connected relation; said lock means being located in said one coupler member and being actuatable to locking and releasing conditions relative to said shut-off valve means in response to movement of the other coupler member out of or into coupled engagement with said one coupler member.

7. In coupling and transfer mechanism for a road-rail vehicle having road wheels and rail wheels selectively shiftable to a load carrying position for transferring from road operation to rail operation and vice versa, and means for causing such shifting of the whee's including an air motor and control valve means controlling the operation of the motor; releasable coupler means on said vehicle; air-supply train pipe means extending to said coupler means; conduit means connecting said motor with said train pipe means; shut-off valve means associated with said coupler means for controlling said train pipe means and having open and closed positions; manually operable means on said vehicle for releasing said coupler means and for causing a sequential actuation of said shut-off valve means and said control valve means; lock means for preventing release of said coup'er means except when said shut-off valve means is in said closed position; and other lock means for preventing actuation of said control valve means except when said shut-off valve means is in said closed position.

8. In coupling and transfer mechanism for a road-rail vehicle having road wheels and rail wheels selectively shiftable to a load carrying position for transferring from road operation to rail operation and vice versa, and means for causing such shifting of the wheels including an air motor and control valve means controlling the operation of the motor; releasable coupler means comprising co-operating coupler members at least one of which is mounted on said vehicle; said coupler members being connectable by impact and separable upon release actuation of the coupler means air-supply train pipe means extending to said one coupler member; conduit means connecting said motor with said train pipe means; shut-off valve means associated with said one coupler member for controlling said train pipe means and having open and closed positions manually operable means on said vehicle for releasing said coupler means and for causing a sequential actuation of said shut-off valve means and said control valve means; first lock means for preventing actuation of said shut-off valve means to said open position except when said coupler members are in their connected relation second lock means for preventing release of said coupler means except when said shut-off valve means is in said closed position; and third lock means for preventing actuation of said control valve means except when said shut-off valve means is in said closed position.

9. In coupling and transfer mechanism for a road-rail vehicle having road wheels and rail wheels selectively shiftable to a load carrying position for transferring from road operation to rail operation and vice versa, and means for causing such shifting of the wheels including an air motor and control valve means controlling the operation of the motor; coupler means on said vehicle; air-supply train pipe means extending to said coupler means; conduit means connecting said motor with said train pipe means; shut-off valve means associated with said coupler means for controlling said train pipe means and having open and closed positions; manually operable means for causing actuation of said control valve means; lock means associated with said manually operable means and being movable to locking and releasing positions for holding or releasing said manually operable means with respect to the manual operation thereof; and other manually operable means for causing actuation of said shut-off valve means to its open and closed positions; said lock means being responsive to said other manually operable means for movement to said locking position in response to actuation of said shut-off valve means to its open position and for movement to said releasing position in response to actuation of said shut-off valve means to its closed position.

10. In coupling and transfer mechanism for a road-rail ve' icle having road wheels and rail whee's selectively shiftable to a load carrying position for transferring from road operation to rail operation and vice versa, and means for causing such shifting of the wheels including an air motor and control valve means controlling the operation of the motor; a coupler on said vehicle and having movab'e holding means actuatable to an open position for releasing the coupler; air-supply train pipe means extending to said coupler; conduit means connecting said motor with said train pipe means; shut-off valve means associated with said coupler for controlling said train pipe means and having open and closed positions; a first manually operable means for causing movement of said holding means to its open position for releasing the coupler; lock means associated with said first manually operable means and movable to locking and releasing positions for locking or releasing said holding means with respect to movement thereof to its open position; a second manually operable means common to said shut-off valve means and to said lock means for causing movement of the latter to its locking and releasing positions substantially simultaneously with movement of said shut-off valve means to its open and closed positions; a third manually operable means for causing actuation of said control valve means; and other lock means responsive to actuation of said second manually operable means and movable to locking and releasing position for locking or releasing said third manually operable means.

11. Coupling and transfer mechanism as defined in claim 10 and wherein said holding means also has an intermediate open position, and wherein said first manually operable means includes self-releasing latch means for retaining said holding means in said intermediate position.

12. In coupling and transfer mechanism for a road-rail vehicle having road wheels and rail wheels selectively shiftable to a load carrying position for transferring from road operation to rail operation and vice versa, and means for causing such shifting of the wheels including an air motor and control valve means controlling the operation of the motor; releasable coupler means on said vehicle; air-supply train pipe means extending to said coupler means; conduit means connecting said motor with said train pipe means; shut-off valve means associated with said coupler means for controlling said train pipe means and having open and closed positions; a first manually operable means for releasing said coupler means; lock means for preventing the release actuation of said coupler means; a second manually operable means connected with said shut-off valve means and said lock means and being operatively effective for moving said shut-off valve means to its open and closed positions and for actuating said lock means to locked and unlocked conditions; a third manually operable means connected with said control valve means for actuating the same; and other lock means associated with said second manually operable means and actuatable thereby to a locked condition for preventing actuation of said control valve means; the first-mentioned lock means and said other lock means being responsive to said second manually operable means and being actuatable to releasing positions during movement of said shut-off valve means to its closed position and actuatable to locking positions during movement of said shut-off valve means to its open position.

13. Road-rail vehicle coupling and transfer mechanism as defined in claim 12 and wherein said control valve means comprises a reversing valve means and a throttle valve means actuatable in succession by said third manually operable means.

14. Road-rail vehicle coupling and transfer mechanism as defined in claim 12 and wherein said coupler means comprises co-operatively engageable coupler members relatively separable from each other upon the release actuation of the coupler means; and wherein lock means located in said coupler means is effective to prevent opening actuation of said shut-off valve means except when said coupler members are in their engaged relation.

15. Road-rail vehicle coupling and transfer mechanism as defined in claim 12 and wherein said coupler means has a through passage therein; and wherein said shut-off valve means is located in said coupler means and controls said through passage.

16. In coupling and transfer mechanism for a road-rail vehicle having road wheels and rail wheels selectively shiftable to a load carrying position for transferring from road operation to rail operation and vice versa, and means for causing such shifting of the wheels including an air motor and control valve devices controlling the operation of the motor; releasable coupler means on said vehicle; air-supply train pipe means extending to said coupler means; conduit means connecting said motor with said train pipe means through said valve devices; shut-off valve means associated with said coupler means for controlling said train pipe means and having open and closed positions; said control valve devices comprising a reversing valve means and a throttle valve means having actuating stems extending in a substantially 90 degree angular relation to each other; manually operable means for actuating said shut-off valve means including an axially shiftable rod; manually operable means for actuating said control valve means comprising a pivotally movable shaft and a pair of levers secured thereto and disposed in a substantially 90 degree angular relation to each other; push-pull link means connecting the levers with said valve devices and comprising a pair of links one of which connects one lever with the stem of said reversing valve means and the other of which connects the other lever with the stem of said throttle valve means; and lock means actuatable by said rod in response to axial movement thereof and having a locking position for preventing pivotal movement of said shaft when said shut-off valve means is in its open position.

17. Road-rail vehicle coupling and transfer mechanism as defined in claim 16 wherein said shut-off valve means is pivotally movable and the lock means for preventing the release actuation of the coupler means is a swingable lock means; and wherein said axially shiftable rod has a push-pull connection with said swingable lock means and is effective through the latter for actuating said shut-off valve means.

18. In coupler mechanism, a coupler body having a recess therein for receiving an associated coupler member and also having guideway means adjacent said recess, retaining means movable in said guideway means and normally having a retaining position relative to said recess for retaining said associated coupler member in the latter, said body having a passage therein for air under pressure, a valve member pivotally movable in said coupler body and controlling said passage, manually operable means connected with said retaining means for causing a release actuation of the latter for releasing said coupler member from said recess, lock means co-operating with said manually operable means and comprising a swingable locking lever connected with said valve member for causing pivotal movement of the latter to open and closed positions, said locking lever having a locking position relative to said manually operable means for preventing a release actuation of said retaining means when said valve member is in its open position and an unlocking position relative to said manually operable means when said valve member is in its closed position, and other manually operable means connected with said locking lever for swinging the same.

19. Coupler mechanism as defined in claim 18 and wherein said retaining means has an intermediate position for engagement by said associated coupler member upon movement of the latter into said recess, and wherein the first-mentioned manually operable means includes self-releasing latch means for holding said retaining means in said intermediate position.

20. In coupled mechanism, a coupler body having a recess therein for receiving an associated coupler member and also having guideway means adjacent said recess, retaining means movable in said guideway and normally having a retaining position relative to said recess for retaining said associated coupler member in the latter, said coupler body having a passage therein for air under pressure, a valve member pivotally movable in said coupler body and controlling said passage, manually operable means connected with said retaining means for causing a release actuation of the latter for releasing said coupler member from said recess, lock means co-operating with said manually operable means and comprising a swingable locking lever connected with said valve member for causing pivotal movement of the latter to its open and closed positions, said locking lever having a locking position relative to said manually operable means for preventing a release actuation of said retaining means when said valve member is in its open position and an unlocking position relative to said manually operable means when said valve member is in its closed position, other manually operable means connected with said locking lever for swinging the same, and means for preventing actuation of said valve member to its open position unless said association coupler member is engaged in said recess and comprising a preventer member projecting into said recess and movable by engagement of said associated coupler member therewith.

References Cited in the file of this patent

UNITED STATES PATENTS

| 1,795,147 | Schleich et al. | Mar. 3, 1931 |
| 1,938,049 | Serrano | Dec. 5, 1933 |
| 2,039,489 | Messick | May 5, 1936 |
| 2,677,472 | Larrson | May 4, 1954 |
| 2,718,197 | Bock et al. | Sept. 20, 1955 |